United States Patent
Krauth

(10) Patent No.: US 9,296,378 B2
(45) Date of Patent: Mar. 29, 2016

(54) CONTROL VALVE HAVING A DEVICE FOR GENERATING DEFINED BRAKING AND RELEASE TIMES

(71) Applicant: KNORR-BREMSE SYSTEME FÜR SCHIENENFAHRZEUGE GMBH, Munich (DE)

(72) Inventor: Christian Krauth, Friedberg (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 413 days.

(21) Appl. No.: 13/932,418

(22) Filed: Jul. 1, 2013

(65) Prior Publication Data
US 2014/0007952 A1   Jan. 9, 2014

(30) Foreign Application Priority Data
Jul. 6, 2012   (DE) .......................... 10 2012 013 523

(51) Int. Cl.
| F16K 31/34 | (2006.01) |
| B60T 15/00 | (2006.01) |
| B60T 13/26 | (2006.01) |
| B60T 15/18 | (2006.01) |

(52) U.S. Cl.
CPC .............. *B60T 15/00* (2013.01); *B60T 13/266* (2013.01); *B60T 15/184* (2013.01); *Y10T 137/7762* (2015.04)

(58) Field of Classification Search
CPC ..... B60T 15/00; B60T 15/184; B60T 13/266; Y10T 137/7762; Y10T 137/7764; Y10T 137/7758; Y10T 137/87193; Y10T 137/86493

USPC .............. 137/488, 485, 489, 596.14, 625; 251/335.2; 303/128, 127, 129, 130, 303/117.1
See application file for complete search history.

(56) References Cited

U.S. PATENT DOCUMENTS

| 3,240,536 | A | * | 3/1966 | Rouillon | ............... | B60T 13/665 303/16 |
| 3,503,656 | A | * | 3/1970 | Wojtecki | ............... | B60T 8/1887 188/195 |
| 3,510,173 | A | * | 5/1970 | Bartolomeo | .......... | B60T 13/406 303/36 |

(Continued)

FOREIGN PATENT DOCUMENTS

| DE | 4329481 A1 | 3/1995 |
| WO | 2012038283 A2 | 3/2012 |

OTHER PUBLICATIONS

Search Report for German Patent Application No. 10 2012 013 523.8; Oct. 30, 2012.

*Primary Examiner* — Craig Schneider
*Assistant Examiner* — Minh Le
(74) *Attorney, Agent, or Firm* — Barnes & Thornburg LLP

(57) ABSTRACT

A control valve for an indirectly acting compressed-air brake of a rail vehicle includes a pneumatic relay valve for controlling a brake cylinder pressure via a pilot-control circuit for generating a temporally defined pilot-control pressure for the proportional activation of the relay valve, wherein, connected upstream of the pilot-control circuit, there is provided a device for generating the braking and release times of the compressed-air brake, wherein the device for generating uniform braking and release times of the compressed-air brake has mechanisms for realizing a volume flow with constant pressure change for the compressed-air supply and the deaeration of the pilot-control circuit.

10 Claims, 1 Drawing Sheet

(56) References Cited

U.S. PATENT DOCUMENTS

| | | | | |
|---|---|---|---|---|
| 4,178,044 A * | 12/1979 | Itoh | B60T 15/46 303/47 |
| 4,700,739 A * | 10/1987 | Flohr | E21B 21/08 137/488 |
| 4,904,027 A * | 2/1990 | Skantar | B60T 13/58 303/15 |
| 5,094,260 A * | 3/1992 | Stuart | G05D 16/202 137/102 |
| 5,104,203 A * | 4/1992 | Ferri | B60T 13/665 303/128 |
| 5,788,339 A * | 8/1998 | Wood | B60T 8/1893 303/122.15 |
| 5,791,744 A * | 8/1998 | Wood | B60T 8/1893 303/122.15 |
| 5,855,417 A * | 1/1999 | Johnston | B60T 7/042 303/10 |
| 6,598,803 B1 * | 7/2003 | Mauchle | B05B 7/1472 239/407 |
| 6,609,769 B2 * | 8/2003 | Hart | B60T 17/228 303/36 |
| 6,709,070 B1 * | 3/2004 | Wright | B60T 15/84 303/38 |
| 7,661,770 B2 * | 2/2010 | Wood | B60T 13/683 303/127 |
| 7,731,303 B1 * | 6/2010 | Ring | B60T 7/10 188/107 |
| 8,157,334 B2 * | 4/2012 | Jeon | B60T 13/585 303/116.1 |
| 8,646,853 B2 * | 2/2014 | Itano | B60T 8/1893 303/128 |
| 2002/0180264 A1 * | 12/2002 | Moffitt | B60T 17/228 303/128 |
| 2004/0124699 A1 * | 7/2004 | Mazur | B60T 8/5012 303/128 |
| 2005/0134113 A1 * | 6/2005 | Ring | B60T 13/665 303/128 |
| 2008/0067866 A1 * | 3/2008 | Root | B60T 17/228 303/128 |
| 2011/0029213 A1 * | 2/2011 | Itano | B60T 8/1705 701/70 |
| 2011/0121640 A1 * | 5/2011 | Matsuyama | B60T 13/665 303/3 |
| 2011/0147141 A1 * | 6/2011 | Schnittger | B60T 13/662 188/152 |
| 2012/0216882 A1 * | 8/2012 | Fishwick | F15B 13/0405 137/488 |
| 2013/0214588 A1 * | 8/2013 | Kiel | B60T 13/683 303/6.01 |

* cited by examiner

CONTROL VALVE HAVING A DEVICE FOR GENERATING DEFINED BRAKING AND RELEASE TIMES

Disclosed embodiments relate to a control valve for an indirectly acting compressed-air brake of a rail vehicle, comprising a pneumatic relay valve for controlling a brake cylinder pressure via a pilot-control circuit for generating a temporally defined pilot-control pressure for the proportional activation of the relay valve, wherein, connected upstream of the pilot-control circuit, there is provided a device for generating the braking and release times of the compressed-air brake.

FIELD AND BACKGROUND

The field of use of disclosed embodiments is rail vehicle engineering. Rail vehicles normally have a self-acting, automatic compressed-air brake in which the drop in pressure in a main air line proceeding from a normal operating pressure brings about the generation of a brake cylinder pressure. The function of converting the falling pressure in the main air line to the rising brake cylinder pressure and vice versa is performed by control valves of the type of interest here.

The speed of the conversion of pressure changes in the main air line, the gradients, and the uniformity of the build-up and dissipation of the brake cylinder pressure during braking and release are significant parameters which permit the safe operation of long, heavy and fast trains without dangerous longitudinal dynamics forces. Control valves therefore have devices for the temporal control of the processes, the efficiency of which devices directly influences the safety and economy of the railway operation.

It is basically advantageous for the pressure increase in the brake cylinders, for example in the event of a sudden full or rapid braking operation, to take place with so-called uniform action. Uniform action is to be understood to mean that the brake cylinder charging time in the event of rapid braking is independent of the size of the brake cylinder volume or of the level of the maximum brake cylinder pressure in a certain value range. The charging of the brake cylinders must not take place too quickly in order to avoid dangerous longitudinal forces in the train; unnecessarily slow charging would, by contrast, entail an unnecessarily long braking travel, and is therefore likewise undesirable.

WO 2012/038283 A2 discloses a control valve for a compressed-air brake of a rail vehicle, the control valve being composed substantially of a pneumatic relay valve for controlling a brake cylinder pressure, a so-called three-pressure element, and a pilot-control circuit for the generation of a pilot-control pressure for the proportional activation of the relay valve. In order, with the control valve, to attain the uniform action explained above, a variable nozzle is arranged on the path for the release, by deaeration, of the pressure from a control chamber of the pilot-control circuit to the environment, the cross section of which variable nozzle can be varied, by actuation means, from a closed state via a minimum cross section to a maximum cross section. Here, the variation may take place in either stepped or continuous form. In addition to at least one nozzle, it is also possible for multiple nozzles to be connected in parallel or in series, wherein at least one of the multiple nozzles is in the form of a variable nozzle.

By means of the variable cross section, it is possible, in the event of a rapid drop in the main air line pressure, to attain an adequately slow drop in the reference pressure in the pilot-control circuit, which can thus be used as a reference for a brake cylinder charging time with uniform action. In the case of a slow drop in the main air line pressure, the nozzle can be increased in size to such an extent that an air volume required for the acceleration of the braking action can flow out. As a result of the accelerating effect on the drop in the main air line pressure, the control valve can, even at the end of long trains, be optimally adjusted through the selection of a suitable maximum cross section of the throttle. Associated with this is the possibility, through a suitable selection of the minimum cross section for the head of the train, of setting an adequately slow build-up of the brake cylinder pressure, which serves to prevent dangerous longitudinal forces. Both effects ultimately permit higher speeds or greater lengths of the trains. Owing to the effect of the nozzle cross sections on the speed of release, by deaeration, of a reference pressure from a constant volume, there is the further resulting advantage that the gradients that arise are independent of the number and size of the brake cylinders and of the brake cylinder maximum pressure, such that a unified control valve can be expediently produced in an economical manner.

In the case of the control valves of interest here with uniform action for rail vehicles, the times for the build-up and dissipation of the brake pressures must comply with certain predefined standards. For example, the braking and release times are defined in the data sheet UIC 540 or in the standard EN 15355.

In the case of control valves of the conventional type, the generation of the braking and release times is realized by means of a device positioned upstream of the pilot-control circuit of the control valve in the compressed-air supply and deaeration arrangement. As a compressed-air supply, the device in the pilot-control circuit provides a constant volume flow, that is to say $\Delta V/\Delta t$=constant. As a de-aeration arrangement, the device in turn permits a defined volume flow to the environment. By means of special nozzles with certain diameters for the compressed-air supply and deaeration of a pilot-control volume of known size, the desired speeds of the pressure changes of the pilot-control pressure, and thus the demanded braking and release times, are attained.

SUMMARY

It is the object of the present invention to configure the braking and release times of a control valve for the compressed-air brake of a rail vehicle independently of the size of the pilot-control volume, in order thereby to attain uniform action.

Disclosed embodiments encompass the technical teaching that the device for generating uniform braking and release times of the compressed-air brake has special means for realizing a volume flow with constant pressure change for the compressed-air supply and for the deaeration of the pilot-control circuit.

BRIEF DESCRIPTION OF THE FIGURES

The disclosed embodiments will be presented in more detail below in conjunction with the description of an exemplary embodiment on the basis of the figures, in which.

DETAILED DESCRIPTION

Figure 1:
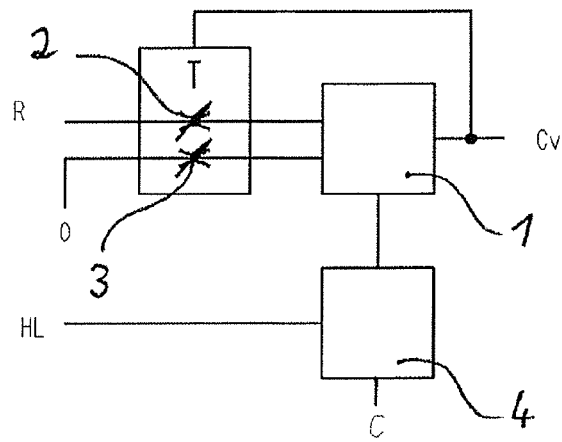
FIG. 1 is a schematic block circuit diagram illustration of a device for generating uniform braking and release times of the compressed-air brake.

The braking and release times generated independently of the pilot-control volume by the measure according to disclosed embodiments have the advantage that the control valve need not be adapted to the size of the pilot-control volume provided on the rail vehicle, or the size of the pilot-control volume on the rail vehicle need not be strictly adhered to in an exact manner. In practice, the adherence to a defined size of the pilot-control volume often involves great effort on the part of the vehicle manufacturers, because the size of the pilot-control volume may vary from vehicle to vehicle depending on the length of the compressed-air line in the pilot-control circuit, or may not be known in advance.

The means for realizing a volume flow with constant pressure change in the pilot-control circuit may comprise a variable throttle, controlled by the pilot-control pressure, of the compressed-air supply and also of the deaeration of the pilot-control circuit.

In technical terms, the device according to disclosed embodiments for generating the braking and release times can be released by means of a pneumatic pressure comparison diaphragm which effects the desired constant pressure change by activation of flow throttles. The generated pilot-control pressure is compared with a comparison pressure, the two pressures prevailing on both sides of the comparison diaphragm. Here, the comparison pressure has a defined volume which is effected by means of an aeration nozzle and a deaeration nozzle by charging and evacuation of a comparison pressure vessel.

Furthermore, the pneumatic comparison diaphragm may also actuate a variable flow throttle for aeration and a variable flow throttle for deaeration of the pilot-control circuit.

To realize the above-described functional scope, it is proposed that a common 2×4/3 directional valve be used which firstly serves for the provision of the comparison pressure and which secondly also comprises the variable flow throttle for aeration and the variable flow throttle for deaeration of the pilot-control circuit. A 2×4/3 directional valve of the type should, in the pressure-balanced state of the comparison diaphragm, ensure that both flow throttles for the pilot-control pressure are open, whereas the two valves for aeration and deaeration of the comparison pressure vessel are closed. Proceeding from the pressure-balanced state at the comparison diaphragm, which corresponds to the middle position of the 2×4/3 directional valve, the aeration and de-aeration functions can be implemented by switching to the upper or lower switching position respectively.

In this respect, in disclosed embodiments, the comparison diaphragm actuates two variable flow throttles for aeration and deaeration of the pilot-control circuit, and simultaneously also two switching valves for aeration and deaeration of the comparison volume, in an integrated manner. By means of this implementation, in terms of valve technology, of the solution according to disclosed embodiments, the switching accuracy of the downstream inlet valve of the pilot controller remains unaffected.

In a further measure which improves disclosed embodiments, by means of suitable configuration of the regulating characteristic, it is made possible for an asymptotic pressure alignment when the pilot-control pressure regulated by the inlet valve of the pilot-control circuit is reached, such as otherwise occurs with a prior-art pilot-control volume with constant nozzling, to be avoided. For this purpose, only the spring-induced restoration of the comparison diaphragm need be configured correspondingly. For this purpose, the comparison diaphragm may be acted on, on both sides, by a restoring spring, which restoring springs place the comparison diaphragm, when not acted on by compressed air, into the middle position as initial position.

In interaction with the 2×4/3 directional valve designed according to disclosed embodiments as a constituent part of the device for generating uniform braking and release times, it is proposed that the inlet valve for regulating the pilot-control pressure be designed as a 3/3 directional valve which, in a first switching position, performs deaeration of the pilot-control circuit, in a second switching position, realizes a shut-off position, and in a third switching position, performs aeration of the pilot-control circuit in accordance with a pressure regulation regime, known per se, of the pilot-control circuit.

According to FIG. 1, a device for generating uniform braking and release times of a compressed-air brake for a rail vehicle is composed substantially of a first variable flow throttle 2, positioned upstream of the pilot-control circuit 1 for generating a temporally defined pilot-control pressure $c_V$, for aeration of the pilot-control circuit 1 from a compressed-air supply R, and of a second variable flow throttle 3 for deaeration of the pilot-control circuit 1 to the environment 0. The first variable flow throttle 2 for aeration and the second variable flow throttle 3 for deaeration of the pilot-control circuit 1 together form the means T, which are the subject of disclosed embodiments, for realizing a volume flow with constant pressure change. The constant pressure change thus applies both for the compressed-air supply R and also for the deaeration 0 of the pilot-control circuit 1.

The control of the brake cylinder pressure C is performed, proceeding from the pressure in a main air line HL, by a relay valve 4 which is pneumatically activated by means of the pilot-control circuit 1.

Figure 2:
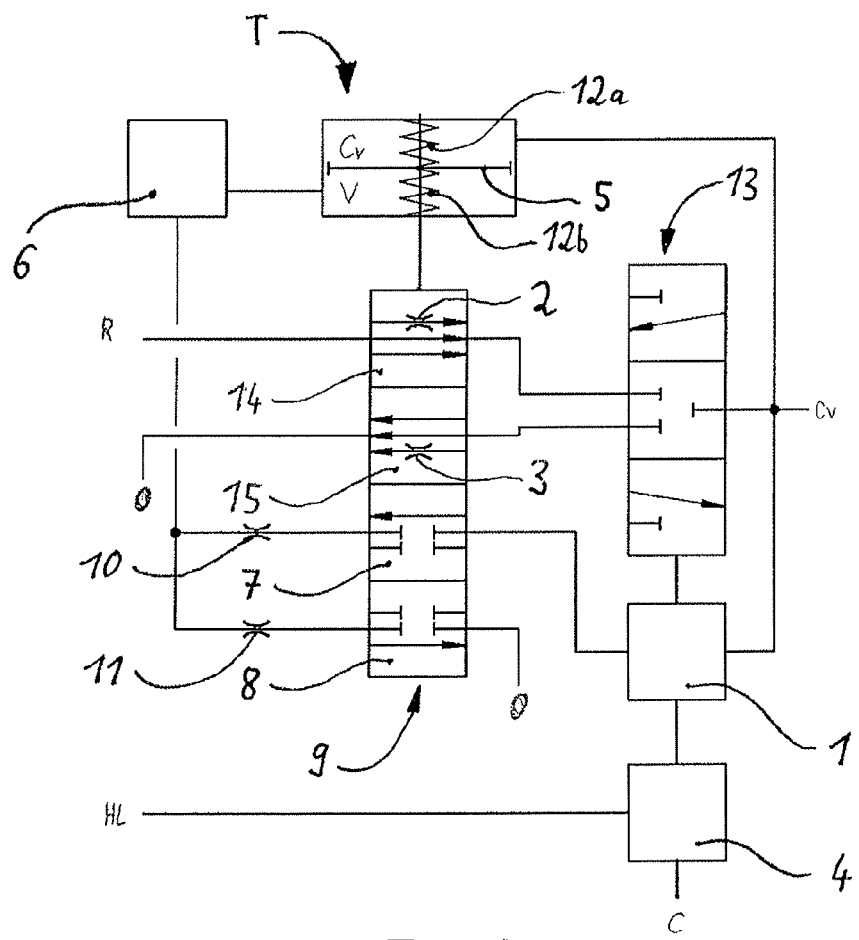
FIG. 2 is a schematic block circuit diagram illustration of a control valve for an indirectly acting compressed-air brake having a device according to FIG. 1.

According to FIG. 2, the means T for realizing a volume flow with constant pressure change according to disclosed embodiments for the compressed-air supply R and the deaeration 0 of the pilot-control circuit 1 comprise a pneumatic comparison diaphragm 5 which is acted on one side by the pilot-control pressure $c_V$ and on the other side by a comparison pressure V of a defined volume. The defined volume is provided here by a comparison pressure vessel 6 which can be respectively charged or evacuated by valve parts 7 and 8 of a 2×4/3 directional valve 9 in combination with in each case one downstream aeration nozzle 10 and one deaeration nozzle 11.

To generate the desired uniform braking and release times of the compressed-air brake, the pneumatic comparison diaphragm 6 also actuates, within the common 2×4/3 directional valve 9, the variable flow throttle 2 for aeration and the variable flow throttle 3 for deaeration of the pilot-control circuit 1, the variable flow throttles in this exemplary embodiment in each case being integrated into the associated valve parts 14 and 15.

The two flow throttles 2 and 3 are open in the pressure-balanced state of the comparison diaphragm 5 illustrated here, whereas the two valve parts 7 and 8 for aeration and deaeration of the comparison pressure vessel 6 are simultaneously closed. In the upper switching position of the 2×4/3 directional valve 9, by contrast, load is exerted by the pilot-control pressure $c_V$ via the flow throttle 2, wherein the comparison pressure vessel 6 is simultaneously also acted on with the pilot-control pressure $c_V$. In the lower switching position, the pilot-control pressure $c_V$ is released by deaeration via the variable flow throttle 3, wherein at the same time, the comparison pressure vessel 6 is de-aerated in a throttled manner via the valve part 8.

The comparison diaphragm 5 is acted on, on both sides, by in each case one restoring spring 12a and 12b, which restoring springs are designed such that, when a pilot-control pressure $c_V$ regulated by an inlet valve 13 of the pilot-control circuit 1 is reached, an asymptotic pressure alignment is avoided. The inlet valve 13 for regulating the pilot-control pressure $c_V$ is in the form of a 3/3 directional valve, and in a first switching position, permits a release, by deaeration, of the pilot-control pressure $c_V$. A middle position serves as a shut-off position. A lower switching position serves for aeration for increasing the pilot-control pressure $c_V$.

Within the scope of the following claims, technical modifications may also be performed which are also encompassed by the scope of protection. For example, it is also possible for the device according to disclosed embodiments for generating uniform braking and release times by effecting constant pressure changes for the compressed-air supply R and the deaeration 0 of the pilot-control circuit 1 to also be implemented using other means in terms of valve technology.

LIST OF REFERENCE SIGNS

1 Pilot-control circuit
2 First variable flow throttle
3 Second variable flow throttle
4 Relay valve
5 Pneumatic comparison diaphragm
6 Comparison pressure vessel
7 First valve part
8 Second valve part
9 Directional valve
10 Aeration nozzle
11 Deaeration nozzle
12 Restoring spring
13 Inlet valve
14 Third valve part
15 Fourth valve part
R Compressed-air supply
0 Deaeration
$c_V$ Pilot-control pressure
HL Main air line
C Brake cylinder pressure
V Comparison pressure

The invention claimed is:

1. A control valve for an indirectly acting compressed-air brake of a rail vehicle, the control valve comprising:
a pneumatic relay valve controlling a brake cylinder pressure via a pilot-control circuit that generates a temporally defined pilot-control pressure for the proportional activation of the relay valve,
wherein, connected upstream of the pilot-control circuit, there is provided a device for generating uniform braking and release times of the compressed-air brake, and
wherein the device for generating uniform braking and release times of the compressed-air brake includes variable flow throttles for realizing a volume flow with constant pressure change for a compressed-air supply and de-aeration of the pilot-control circuit, and
further comprising a pneumatic comparison diaphragm for the variable throttling of the compressed-air supply and de-aeration of the pilot-control circuit, the pneumatic comparison diaphragm being acted on, on one side, by the pilot-control pressure and, on the other side, by a comparison pressure of a defined volume.

2. A control valve for an indirectly acting compressed-air brake of a rail vehicle, the control valve comprising:
a pneumatic relay valve controlling a brake cylinder pressure via a pilot-control circuit that generates a temporally defined pilot-control pressure for the proportional activation of the relay valve,
wherein, connected upstream of the pilot-control circuit, there is provided a device for generating uniform braking and release times of the compressed-air brake,
wherein the device for generating uniform braking and release times of the compressed-air brake includes mechanisms for realizing a volume flow with constant pressure change for a compressed-air supply and de-aeration of the pilot-control circuit, and
wherein the mechanisms realizing a volume flow with constant pressure change in the pilot-control circuit comprise a variable throttle, controlled by the pilot-control pressure, of the compressed-air supply and de-aeration of the pilot-control circuit.

3. The control valve of claim 2, further comprising a pneumatic comparison diaphragm for the variable throttling of the compressed-air supply and de-aeration of the pilot-control circuit is provided, the pneumatic comparison diaphragm being acted on, on one side, by the pilot-control pressure and, on the other side, by a comparison pressure of a defined volume.

4. The control valve of claim 3, further comprising a comparison pressure vessel that provides the comparison pressure for the pneumatic comparison diaphragm, which comparison pressure vessel is charged and evacuated via an aeration nozzle and a de-aeration nozzle by corresponding valve parts.

5. The control valve of claim 3, wherein the pneumatic comparison diaphragm actuates a variable flow throttle for aeration and a variable flow throttle for de-aeration of the pilot-control pressure circuit.

6. The control valve of claim 4, wherein the provision of the comparison pressure and the variable flow throttle for aeration and the variable flow throttle for de-aeration of the pilot-control circuit are realized with a common 2×4/3 directional valve.

7. The control valve of claim 6, wherein, in a pressure-balanced state of the comparison diaphragm, the two flow throttles for the pilot-control pressure are open, whereas the two corresponding valve parts for aeration and de-aeration of the comparison pressure vessel are closed.

8. The control valve of claim 3, further comprising at least one restoring spring which acts on the comparison diaphragm is configured such that, when a pilot-control pressure regulated by an inlet valve of the pilot-control circuit is reached, an asymptotic pressure alignment is avoided.

9. The control valve of claim 8, wherein the inlet valve for the regulation of the pilot-control pressure is in the form of a 3/3 directional valve.

10. A compressed-air brake of a rail vehicle, comprising at least one control valve for an indirectly acting compressed-air brake of a rail vehicle, the control valve comprising:
a pneumatic relay valve controlling a brake cylinder pressure via a pilot-control circuit that generates a temporally defined pilot-control pressure for the proportional activation of the relay valve,
wherein, connected upstream of the pilot-control circuit, there is provided a device for generating uniform braking and release times of the compressed-air brake,
wherein the device for generating uniform braking and release times of the compressed-air brake includes mechanisms for realizing a volume flow with constant pressure change for a compressed-air supply and de-aeration of the pilot-control circuit, and
wherein the mechanisms realizing a volume flow with constant pressure change in the pilot-control circuit comprise a variable throttle, controlled by the pilot-control pressure, of the compressed-air supply and de-aeration of the pilot-control circuit.

* * * * *